United States Patent [19]

Lockwood

[11] Patent Number: 5,339,443

[45] Date of Patent: Aug. 16, 1994

[54] ARBITRATING MULTIPROCESSOR ACCESSES TO SHARED RESOURCES

[75] Inventor: James M. Lockwood, San Jose, Calif.

[73] Assignee: Sun Microsystems, Inc., Mountain View, Calif.

[21] Appl. No.: 991,497

[22] Filed: Dec. 17, 1992

Related U.S. Application Data

[63] Continuation of Ser. No. 794,573, Nov. 19, 1991, abandoned.

[51] Int. Cl.$^5$ .............................................. G06F 13/14
[52] U.S. Cl. ........................... 395/725; 364/DIG. 1; 364/230; 364/230.1; 364/242.6; 364/242.7
[58] Field of Search ..................... 395/325, 725, 650

[56] References Cited

U.S. PATENT DOCUMENTS

| | | | |
|---|---|---|---|
| 3,676,860 | 7/1972 | Collier | 395/725 |
| 4,115,851 | 9/1978 | Nagano | 395/425 |
| 4,574,350 | 3/1986 | Starr | 395/725 |
| 5,179,705 | 1/1993 | Kent | 395/725 |

OTHER PUBLICATIONS

Patent Abstracts of Japan; vol. 12, No. 194 (P-713) Jun. 1988 and JP-A-62 298866 (Fujitsu) Dec. 25, 1987 *abstract*.

*Primary Examiner*—Debra A. Chun
*Attorney, Agent, or Firm*—Blakely Sokoloff Taylor & Zafman

[57] ABSTRACT

In a multiprocessor computer system, an access request and an access grant register is provided for storing an access request and an access grant semaphore for each shared resource. The access request and grant semaphores having a number of access request and grant bits assigned to the processors. Additionally, circuits are provided for each access request register for setting/clearing individual access request bits, and simultaneous reading of all access request bits of the stored access request semaphore. Furthermore, coordinated request and grant masks that reflect the relative access priorities of the processors are provided for the processors to use in conjunction with the current settings of the access request and grant semaphores to determine whether a shared resource is granted to a lower priority processor and whether a shared resource is being requested by a higher priority processor. As a result, multiprocessor accesses to shared resources are arbitrated in a manner having a number of advantages over the prior art.

20 Claims, 5 Drawing Sheets

ARBITRATING MULTIPROCESSOR ACCESSES TO SHARED RESOURCES

This is a continuation of application Ser. No. 07/794,573, filed Nov. 19, 1991 now abandoned.

BACKGROUND OF THE INVENTION

1. Field of the Invention

The present invention relates to the field of computer systems, in particular, multiprocessor computer systems. More specifically, the present invention relates to arbitrating multiprocessor accesses to shared resources, which has particular application to multiprocessor communication.

2. Background

Today, many computer systems comprise multiple processors. Typically, the processors share a number of resources, for example, an area in memory for interprocessor communication. For many of these multiprocessor systems, the processors access the shared resources through a common high speed bus. Arbitration function is provided to grant momentary exclusive ownership of the bus to a particular processor. For those multiprocessor systems having private cache memory in some of the processors, coherent data management function is also provided for accessing the shared resources. The arbitration and coherent data management functions are either provided in a centralized manner by the bus or in a decentralized manner by the processors.

Additionally, some form of semaphore is employed to control access to each of the shared resources. A semaphore is a mutual exclusion lock. A processor reads the semaphore and checks if the semaphore equals a predetermined value, for example, zero, to determine if a shared resource is currently free. If the shared resource is free, the processor takes temporary ownership of the shared resource and writes another predetermined value back for the semaphore, for example, a non-zero value, to indicate such temporal taking of ownership. If the shared resource is not free, the processor repeats the reading and checking until the semaphore contains the predetermined value indicating the shared resource is free. At the end of the access, the processor reset the semaphore to indicate the shared resource is free again. The semaphore management protocol also includes mechanism or rule that the semaphore is reset only by the last processor that took temporal ownership of the shared resource. To ensure the read-modify-write manipulation of a semaphore by a processor is uninterfered by other processor trying to gain temporal ownership of the shared resource, typically the bus provides atomic bus cycles by which the processor can gain temporal ownership of the bus for a number of uninterrupted contiguous bus cycles.

Traditional semaphore management has at least four disadvantages:

1) most semaphore management tend to prioritize processor accesses on a first come first serve basis,
2) for those semaphore management that allow relative access priority settings, they generally do not provide a simple way for the contending processors to determine their own access priority level, or for the relative access priority to be changed dynamically,
3) they generally do not provide a simple way for determining which processor is the current owner of a shared resource,
4) they require all processors to be able to perform the read-modify write operations and the bus to support atomic bus cycles, furthermore, the read-modify-write operations are performed by the processors in like manner thereby excluding the possibility of incorporating heterogeneous processors in the same computer system.

As will be disclosed, the present invention provides a method and apparatus for arbitrating multiprocessor accesses to shared resources that overcomes the disadvantages of the prior art.

SUMMARY OF THE INVENTION

It is therefore the object of the present invention to provide a method and apparatus for arbitrating multiprocessor accesses to shared resources which can be applied to multiprocessor communication.

It is another object of the present invention that accesses to shared resources are arbitrated based on relative access priority which can be altered dynamically.

It is another object of the present invention that a contending processor is able to determine its own access priority and the current owner of a shared resource.

It is another object of the present invention that the high speed bus does not have to support atomic bus cycles, and the processors do not have to perform the read-modify-write operations in like manner or support the read-modify-write operations at all, thereby enabling the incorporation of heterogeneous processors in the same computer system.

Under the preferred embodiment of the present invention, these and other objectives are achieved by providing an access request register and an access grant register for storing an access request semaphore and an access grant semaphore for each of the shared resources respectively on a multiprocessor computer system. The access request and grant registers are designed to be sufficiently large enough to store access request and grant semaphores having an access request bit and an access grant bit assigned to each of the processors. In their presently preferred form, the access request and grant bits are assigned to the processors in ascending order starting with the least significant bit being assigned to the lowest priority processor.

Additionally, under the preferred embodiment of the present invention, corresponding circuits that allows setting/clearing individual access request bits and simultaneous reading of all access request bits are provided for accessing the access request semaphores stored in the access request registers.

Furthermore, a request mask and a grant mask for each of the shared resources is provided and assigned to each of the processors. The request and grant masks reflect the relative access priorities of the processors. The request and grant masks are used by the processors in conjunction with the current settings of the access request and grant semaphores to determine whether the shared resource is granted to a lower priority processor and whether the shared resource is being requested by a higher priority processor.

A processor makes its request for gaining temporal exclusive ownership of a shared resource by setting its assigned access request bit of the access request semaphore. The requesting processor then waits a predetermined amount of time. The minimum predetermined amount of time is designed to be greater than the largest amount of time required by the slowest processor to recognize the request and to set its assigned access grant bit of the access grant semaphore.

Upon waiting the predetermined amount of time, the requesting processor then repeatedly check the access grant and request semaphores to ensure there are no lower access priority grant nor higher access priority request active. Upon making such determination, the requesting processor then sets its access grant bit of the access grant semaphore and takes temporal exclusive ownership of the shared resource. After gaining temporal exclusive ownership, the owning processor performs its desired operations against the shared resource. Upon completion of these operations, the owning processor unsets its assigned access grant and request bits of the access grant and request semaphores.

As a result, the processors of a multiprocessor computer system may perform interprocessor communication via the shared resource. A contending processor may determine its relative access priority and the current owner based on the access request and grant semaphores. The relative access priorities of the processors to a shared resource may also be changed dynamically by imposing a new set of request and grant masks that reflect different relative access priorities. The need for the high speed bus and the processors to support atomic access cycles, and for the processors to support read-modify-write operations in like manner is eliminated. As a result, heterogeneous processors may be incorporated in the same multiprocessor computer system.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION OF THE PREFERRED EMBODIMENT

A method and apparatus for arbitrating processor accesses to shared resources on a multiprocessor computer system is disclosed, which has particular application to multiprocessor communication. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
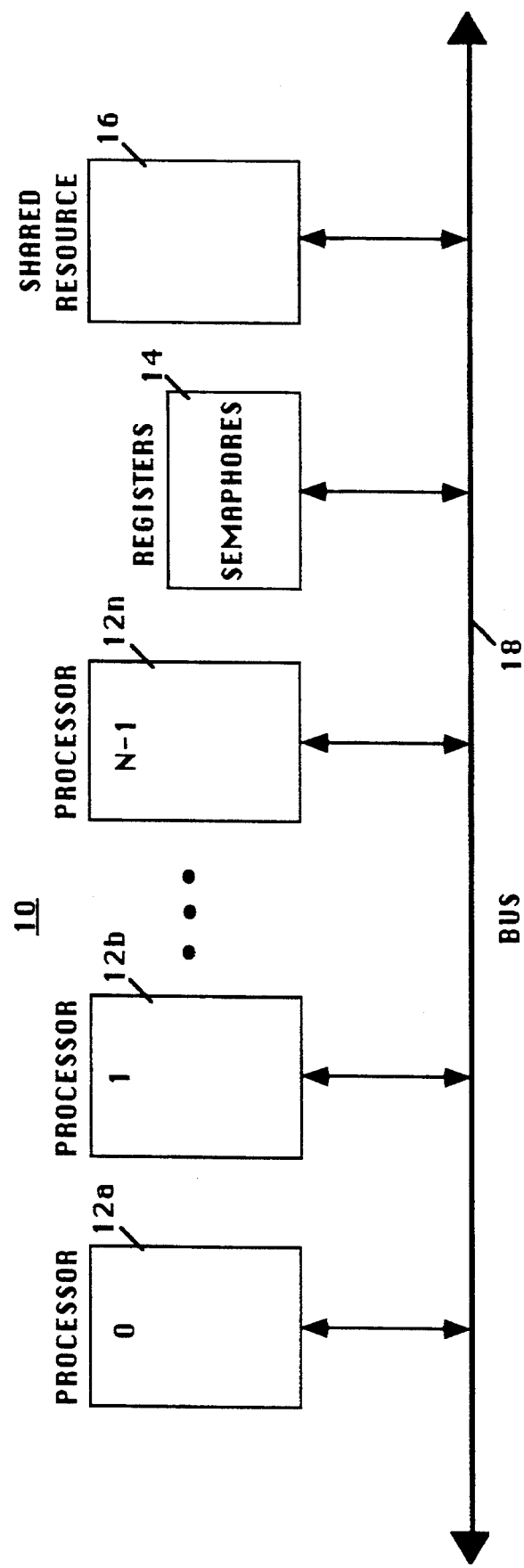
FIG. 1 illustrates the preferred embodiment of a multiprocessor computer system that incorporates the teachings of the present invention.

Referring now to FIG. 1, a block diagram illustrating the preferred embodiment of a multiprocessor computer system that incorporates the teachings of the present invention is shown. Shown are a plurality of processors $12a$–$12n$. Each of the processors $12a$–$12n$ comprise an request mask register and a grant mask register for storing a request mask and a grant mask respectively, which will be described in further detail below. The processors $12a$–$12n$ are intended to represent a broad category of well known processors. In fact, under the preferred embodiment, processors $12a$–$12n$ may be a mix of different well known processors that do not support read-modify-write operations in like manner or do not support read-modify-write operations at all. Particular examples of these processors $12a$–$12n$ include SPARC ™ processors manufactured by Sun Microsystems, Inc., Mountain View, Calif., and i486 ™ processors manufactured by Intel, Inc., Santa Clara, Calif. (SPARC ™ is a registered trademark of Sun Microsystems, Inc, and i486 ™ is a registered trademark of Intel, Inc.).

The processors $12a$–$12n$ are coupled to an active high speed bus 18. The active high speed bus 18 provides centralized arbitration function for granting temporal exclusive ownership of the bus 18. Additionally, the active high speed bus 18 provides coherent data management functions for the processors $12a$–$12n$ if some of the processors $12a$–$12n$ comprise private cache memory. However, under the presently preferred embodiment, the active high speed bus 18 does not have to provide atomic bus cycles whereby a processor may own the bus 18 for a number of uninterrupted contiguous bus cycles. The active high speed bus 18 is also intended to represent a broad category of well known active high speed buses. In fact, active high speed bus 18 may comprise multiples of these well known buses coupled together by bus adaptors. Particular examples of the well known high speed buses include the MBus of Sun Microsystems, Inc., and the SBus. Although an active high speed bus is preferred, it will be appreciated that high speed bus 18 may also be an inactive bus, with the bus arbitration and coherent data management functions distributed to the various processors $12a$–$12n$.

Also shown is a shared resource 16 and its corresponding semaphore registers 14 coupled to the active high speed bus 18. The shared resource 16 is intended to represent a broad category of resources on a multiprocessor computer system. For example, the shared resource 16 may be an area of main memory used as a shared message buffer for interprocessor communication between the processors $12a$–$12n$. The corresponding semaphore registers 14 comprise an access request register (not shown), an access grant register (not shown) and corresponding circuits (not shown) for writing into and reading from the registers. The semaphore registers 14 will be described in further detail below. Although only one shared resource 16 is illustrated in FIG. 1, it will be appreciated that the multiprocessor computer system 10 may comprise a number of shared as well as unshared resources, provided each of the additional shared resources also has its own corresponding semaphore registers. Furthermore, although the semaphore registers 14 are preferred, it will also be appreciated that memory locations in memory may be used instead, provided the active high speed bus 18 supports atomic bus cycles for performing read-modify-write operations into the memory locations, and the processors 12a–12n support read-modify-write operations in like manner.

Figure 2:
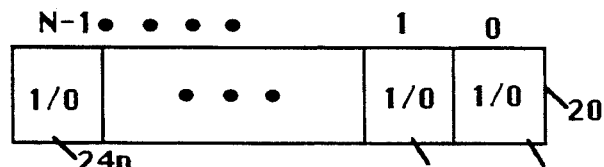
FIG. 2 illustrates the semaphores of the present invention used to arbitrate processor accesses to a shared resource on the multiprocessor computer system illustrated in FIG. 1.
Figure 2:
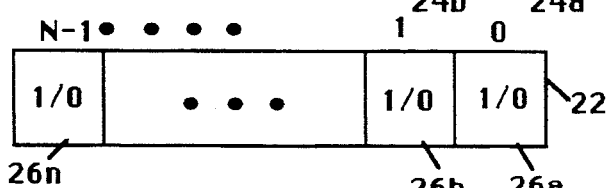

Referring now to FIG. 2, a block diagram illustrating the access request register, the access grant register and the corresponding access request and grant semaphores stored in these registers is shown. Shown is an access request register 20 storing an access request semaphore having a plurality of access request bits 24a–24n. Each of the access request bits 24a–24n is assigned to a processor. In its presently preferred form, the access request bits 24a–24n are assigned to the processors in ascending order starting with the least significant bit assigned to the processor with the lowest priority. It will be appreciated that the access request bits 24a–24n may be assigned in a variety of other manners.

Also shown is a grant access register 22 storing an access grant semaphore having a plurality of access grant bits 26a–26n. Each of the corresponding access grant bits 26a–26n is assigned to the same processor. Similarly, in its presently preferred form, the access grant bits 26a–26n are also assigned to the processors in ascending order starting with the least significant bit assigned to the processor with the lowest priority. It will also be appreciated that the access grant bits 26a–26n may be assigned in a variety of other manners, provided it is consistent with the way the access request bits 24a–24n are granted.

Each of the access request bits 24a–24n is set individually by its assigned processor when its assigned processor request access to the shared resource, which will be described in further detail below. Multiple access request bits 24a–24n may be set by a number of requesting processors at one time. Each of the access grant bits 26a–26n is set by its assigned processor when its assigned processor after requesting accessing to the shared resource determines that the shared resource is neither granted to a lower priority processor nor being requested by a higher priority processor, which will also described in further detail below. It will be appreciated that only one access grant bit 26a, 26b, ... or 26n, will be set by one processor at one time. As a result, the current owner of the shared resource can be determined based on the access grant semaphore easily.

Each of the access grant bits 26a–26n is unset by its assigned processor after its assigned processor completed access to the shared resource. Each of the access request bits 24a–24n is unset by its assigned processor after its assigned processor unset the corresponding access grant bit, 26a, 26b, ... or 26n.

A requesting processor determines whether the shared resource is granted to a lower priority processor and whether the shared resource is being requested by a higher priority processor using the access request and grant semaphores in conjunction with an access request mask and an access grant mask, which will be described in further detail below. It will be appreciated that under the present invention, a requesting processor does not have to concern itself with whether the shared resource is granted to a higher priority processor nor whether the shared resource is being requested by a lower priority processor.

Figure 3:
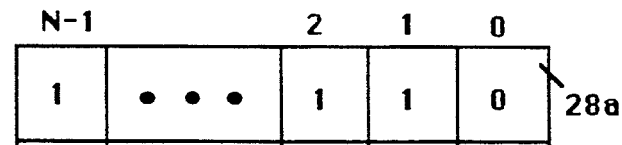
FIG. 3 illustrates the access request masks of the present invention used to arbitrate processor accesses to a shared resource on the multiprocessor computer system illustrated in FIG. 1.
Figure 3:
Figure 3:
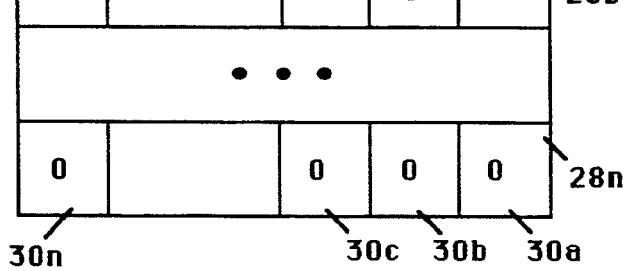

Referring now to FIG. 3, a block diagram illustrating the access request masks of the present invention is shown. Shown are a plurality of access request masks 28a–28n comprising a plurality request mask bits 30a–30n. Each of the request masks 28a–28n comprises the same number of bits as the access request semaphore. For each request mask, 28a, 28b, ..., or 28n, the request mask bits 30a–30n that are in higher bit positions than the request bit of the access request semaphore assigned to the processor are set, and all other request mask bits are unset. For examples, for processor 0, request mask bits 1 through n are set and request mask bit 0 is unset; for processor 1, request mask bits 1 through n are set and request mask bits 0 through 1 are unset; and for processor n, all request mask bits 0 through n are unset.

The request masks 28a–28n are stored in the private request mask registers of the processors. A requesting processor determines whether the shared resource is being requested by a higher priority processor by performing a logical AND against the current bit settings of the access request semaphore and its request mask. The request masks 28a–28n may be changed dynamically, thereby altering the relative access priorities of the processors dynamically, provided the grant masks which are described below are also changed at the same time.

Figure 4:
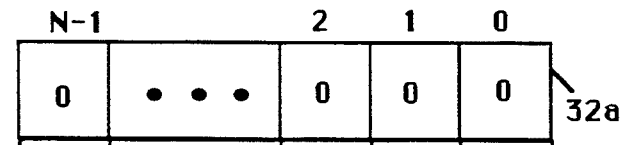
FIG. 4 illustrates the access grant masks of the present invention used to arbitrate processor accesses to a shared resource on the multiprocessor computer system illustrated in FIG. 1.
Figure 4:
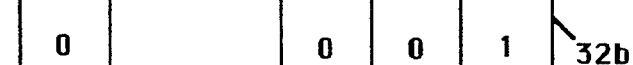
Figure 4:
Figure 4:
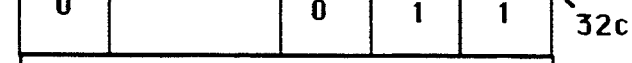

Referring now to FIG. 4, a block diagram illustrating the access grant masks of the present invention is shown. Shown are a plurality of access grant masks 32a–32n comprising a plurality grant mask bits 34a–34n. Each of the grant masks 32a–32n comprises the same number of bits as the access grant semaphore. For each grant mask, 32a, 32b, ..., or 32n, the grant mask bits 32a–32n that are in lower bit positions than the grant bit of the access grant semaphore assigned to the processor are set, and all other grant mask bits are unset. For examples, for processor 0, all grant mask bits 0 through n are unset; for processor 1, grant mask bits 0 is set and grant mask bits 1 through n are unset; and for processor n, grant mask bits 0 through n-1 are set and grant mask bits 0 is unset.

Similarly, the grant masks 32a–32n are stored in the private grant mask registers of the processors. A requesting processor determines whether the shared resource is granted to a lower priority processor by performing a logical AND against the current bit settings of the access grant semaphore and its grant mask. As described earlier, the grant masks 28a–28n may be changed dynamically, thereby altering the relative access priorities of the processors dynamically, provided the request masks are also changed at the same time.

Figure 5A:
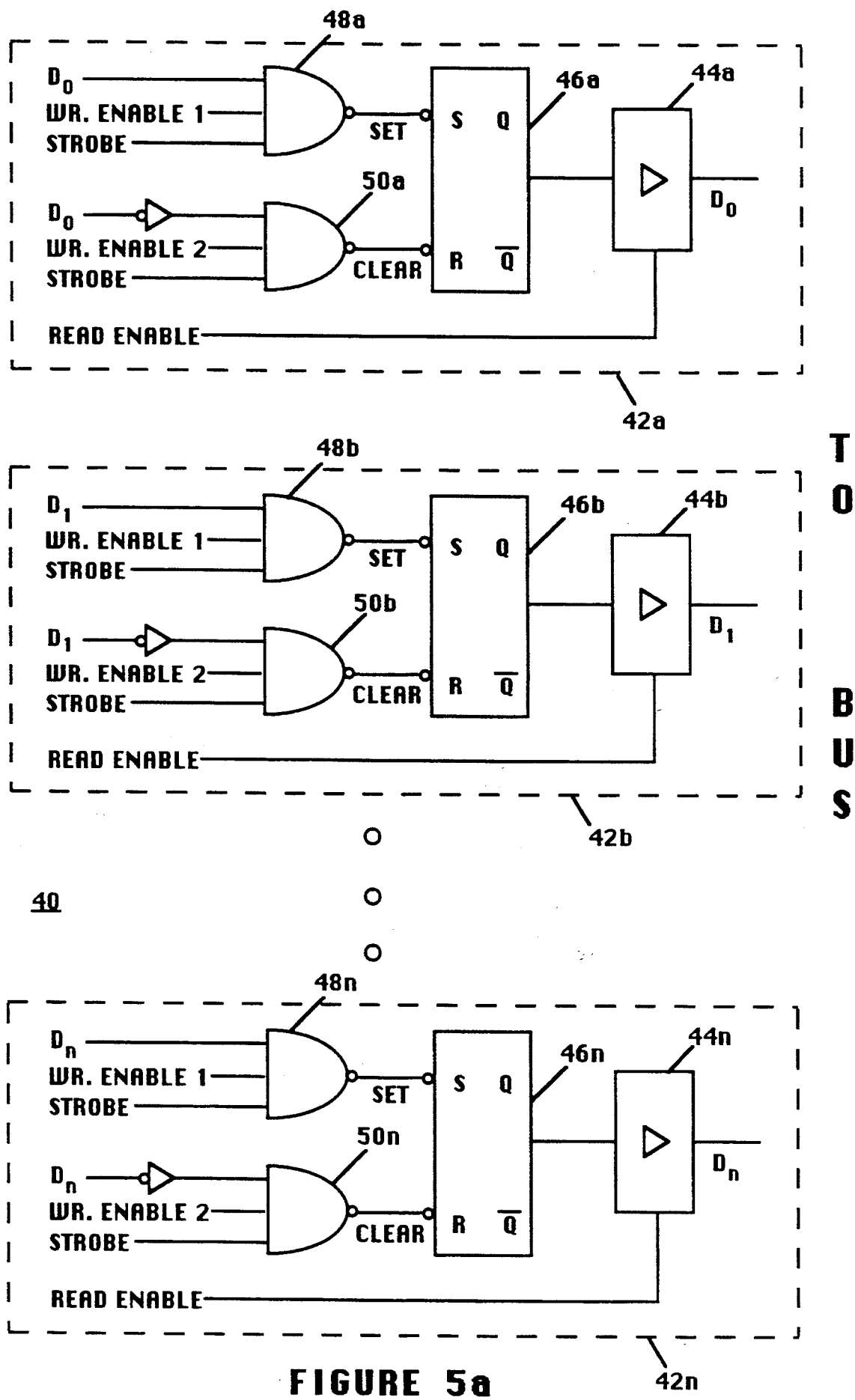
FIGS. 5a–5b illustrate two embodiments of the circuit of the present invention for setting/clearing individual bits and simultaneous readings of all request bits of the request semaphores stored in an access request register on the multiprocessor computer system illustrated in FIG. 1.
Figure 5B:
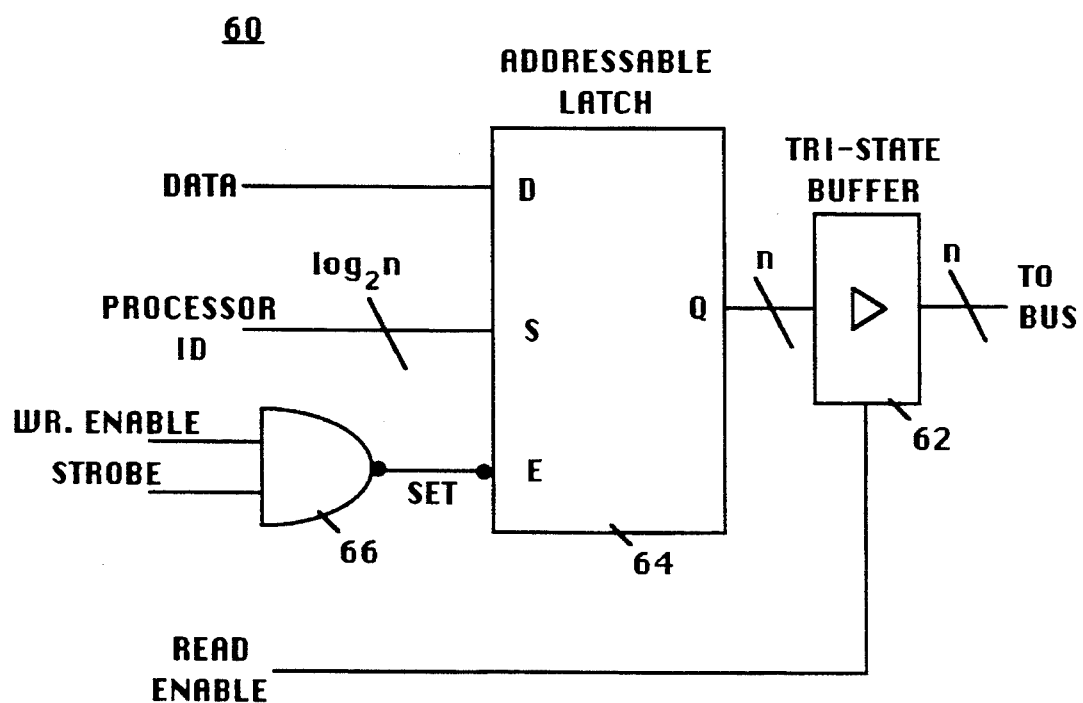

Referring now to FIGS. 5a and 5b, two block diagrams illustrating two embodiments of the circuit for setting/clearing individual access request bits, and simultaneous reading of all access request bits of the access request semaphores stored in the access request registers are shown. The first embodiment illustrated in FIG. 5a is designed for multiprocessor computer systems that do not have processor identifiers presented on the high speed bus, whereas, the second embodiment illustrated in FIG. 5b is designed for multiprocessor computer systems that presents the processor identifiers on the high speed bus. As described earlier, only one access grant bit of the access grant semaphore is set at one time, thus no special circuit for writing and reading the access grant semaphore into and from the access grant register is required. The access grant register may be implemented with any well known manner in the art.

Shown in FIG. 5a are identical circuit segments 42a–42n. Each of the identical circuit segments 42a–42n is used for setting, clearing, and reading the access request bits of the access request semaphores assigned to a processor. Each of the identical circuit segments 42a–42n comprises a first AND gate 48a, 48b, . . . , or 48n, a second AND gate 50a, 50b, . . . , or 50n, and a tri-state buffer 44a, 44b, . . . , or 44n coupled to a latch 46a, 46b, . . . , 46n, of the access request register. The AND gates 48a–48n, 50a–50n, the tri-state buffers 44a–44n, and the latches 46a–46n are well known in the art.

The first AND gate 48a, 48b, . . . , or 48n, is for setting the assigned access request bit of the access request semaphore. The first AND gate 48a, 48b, . . . , or 48n, takes a data line, a first write enable signal, and a strobe signal from the high speed bus as inputs, and outputs a signal into the latch 46a, 46b, . . . , 46n. In their presently preferred form, if output value is a "1", the access request bit is set; if the output value is a "0", no action is taken.

Similarly, the second AND gate 50a, 50b, . . . , or 50n, is for clearing the assigned access request bit of the access request semaphore. The second AND gate 50a, 50b, . . . , or 50n, takes a data line, a second write enable signal, and a strobe signal from the high speed bus as inputs, and outputs a signal into the latch 46a, 46b, . . . , 46n. In their presently preferred form, if output value is a "1", the access request bit is unset; if the output value is a "0", no action is taken.

The latch 46a, 46b, . . . , or 46n takes either the output of the first AND gate 48a, 48b, . . . , or 48n, or the output of the second AND gate 50a, 50b, . . . , or 50n as input, and outputs a signal into the tri-state buffer 44a, 44b, . . . , or 44n. The tri-state buffer 44a, 44b, . . . , or 44n, takes the output of the latch 46a, 46b, . . . , or 46n, and a read enable signal from the high speed bus as inputs and output a signal onto the data line of the high speed bus.

Shown in FIG. 5b is an AND gate 66 and a tri-state buffer 62 coupled to the access request register which is implemented by an addressable latch 64. The AND gate 66, the tri-state buffer 62 and the addressable latch 64 are also well known in the art. The AND gate 66 takes a write enable signal and a strobe signal from the high speed bus as input and outputs a signal to the addressable latch. The addressable latch 64 takes the output of the AND gate 66, a data line from the high speed bus, and the processor identifier from the high speed bus as inputs, and outputs a plurality of signals to the tri-state buffer 62. The processor identifier is used to select the access request/grant bit for replacement with the input from the data line. The tri-state buffer 62 takes the output signals of the addressable latch 64 and a read enable signal from the high speed bus as input and outputs a plurality of signals on the high speed bus.

It will be appreciated by providing one of the circuits illustrated in FIGS. 5a and 5b, the access request semaphore can be manipulated without requiring support of atomic bus cycles by the high speed bus, whereby the requesting processor can have temporal exclusive ownership of the high speed bus for a number of uninterrupted clock cycles. Furthermore, the processors are not required to support read-modify-write operations in like manner or even support read-modify-write operations at all. As a result, heterogeneous processors may be incorporated in the same multiprocessor computer system.

Figure 6:
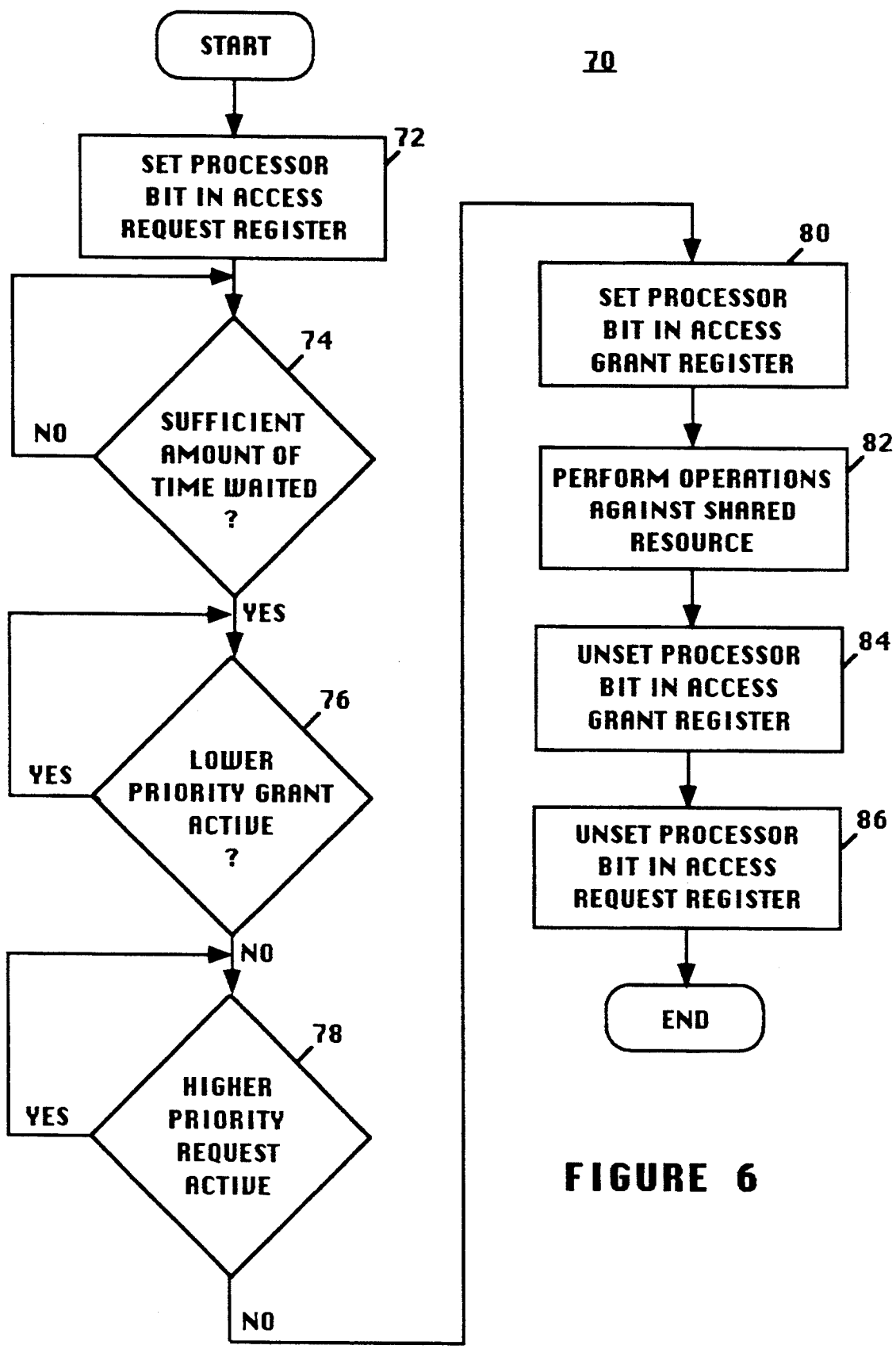
FIG. 6 illustrates the method of the present invention for arbitrating processor accesses to a shared resource on the multiprocessor computer system illustrated in FIG. 1.

Referring now to FIG. 6, a block diagram illustrating the method of the present invention for arbitrating processor accesses to shared resources is shown. As shown in the figure, a requesting processor request access to the shared resource by setting its assigned request bit of the access request semaphore, block 72. The requesting processor then waits a pre-determined amount of time, block 74. The minimum pre-determined amount of wait time is greater than the largest amount of time required by the slowest processor to recognize the request, and to set its assigned access grant bit of the access grant semaphore. As described earlier, the processor recognizes the request by retrieving the current bit settings of the access request semaphore from the access request register and performing a logical AND against the retrieved bit settings and the processor's request mask.

Upon waiting at least the minimum pre-determined amount of time, the requesting processor determines if the shared resource is granted to a lower priority processor, block 76. As described earlier, the requesting processor makes the determination by retrieving the current bit settings of the access grant semaphore from the access request register and performing a logical AND against the retrieved bit settings and the processor's grant mask. If the processor is currently granted to a lower priority processor, the requesting processor repeats the determination until the shared resource is no longer granted to a lower priority processor.

Upon determining that the shared resource is not granted to a lower priority processor, the requesting processor determines if the shared resource is being requested by a higher priority processor, block 78. Similarly, if the shared resource is being requested by a higher priority processor, the requesting processor repeats the determination until the shared resource is not being requested by a higher priority processor.

Upon determining that the shared resource is not being requested by a higher pdodty processor, the requesting processor then sets the assigned access grant bit of the access grant semaphore, block 80, and takes temporal exclusive ownership of the shared resource. The granted processor performs its desired operations against the shared resource, block 82, for example, writing a message if the shared resource is a shared message buffer.

Upon completion of the operations against the shared resource, the granted processor unsets the assigned access grant bit of the access grant semaphore, block 84. After unsetting the assigned access grant bit, the ungranted processor unsets the assigned access request bit of the access request semaphore, block 86.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. In a computer system comprising a plurality of processors coupled to a shared resource, a method for arbitrating access to said shared resource by said processors, said method comprising the steps of:

a) setting an assigned request indicator of an access request semaphore by a requesting processor to a request access to said shared resource, said access request semaphore comprising a plurality of access request indicators correspondingly assigned to said processors, said access request indicators being priority ordered, said priority order being statically predetermined;

b) waiting a predetermined amount of time, said predetermined amount of time being sufficiently long for said setting to be detected by each of said processors;

c) retrieving an access grant semaphore repeatedly and determining if said shared resource is currently granted to a lower priority processor by said requesting processor, said access grant semaphore comprising a plurality of access grant indicators correspondingly assigned to said processors, said access grant indicators being similarly priority ordered as said access request indicators;

d) retrieving said access request semaphore repeatedly and determining if said shared resource is currently requested by a higher priority processor by said requesting processor when said shared resource is not granted to a lower priority processor;

e) setting its assigned access grant indicator of said access grant semaphore by said requesting processor to grant itself access to said shared resource when said shared resource is not requested by a higher priority processor;

f) accessing said shared resource by said granted processor; and g) resetting its assigned access grant indicator of said access grant semaphore by said accessing processor to remove itself from being granted access to said shared resource upon completion of accessing said shared resource; and h) resetting its assigned access request indicator of said access request semaphore by said ungranted processor to remove itself from requesting access to said shared resource upon resetting its assigned access grant indicator of said access grant semaphore.

2. The method as set forth in claim 1, wherein, said access request and access grant semaphores comprise a plurality of access request and grant bits respectively, said access request and grant bits being priority ordered in a statically predetermined ascending manner with the least and most significant bits denoting the lowest and the highest priorities respectively;

each of said processors is assigned one of said access request and grant bits of said access request and grant semaphores with the processors assigned the least and most significant bits having the lowest and highest priorities respectively;

said requesting/accessing/ungranted processor sets and resets its assigned access request and grant bits in said steps a), e), g) and h) respectively.

3. The method as set forth in claim 2, wherein said requesting processor determines if said shared resource is currently granted to a lower priority processor by performing a logical AND operation against said access grant semaphore and an access grant mask assigned to said requesting processor, said assigned access grant mask comprising a plurality of grant mask bits corresponding to said access grant bits of said access grant semaphore, said grant mask bits being set if they correspond to access grant bits that are lower than said assigned access grant bit of said requesting processor and not set if they correspond to all other access grant bits.

4. The method as set forth in claim 3, wherein, said requesting processor determines if said shared resource is currently being requested by a higher priority processor by performing a logical AND operation against said access request semaphore and an access request mask assigned to said requesting processor, said assigned access request mask comprising a plurality of request mask bits corresponding to said access request bits of said access request semaphore, said request mask bits being set if they correspond to access request bits that are higher than said assigned access request bit of said requesting processor and not set if they correspond to all other access request bits.

5. The method as set forth in claim 2, wherein,
said access request and grant semaphores are stored in a first and a second memory location of memory, said computer system further comprising said memory; and said processors, said shared resource and said memory are coupled to a high speed bus, said high speed bus providing atomic bus cycles for accessing a selected one of said first and second memory locations.

6. The method as set forth in claim 2, wherein,
said access request and grant semaphores are stored in an access request register and an access grant register respectively, said requesting processor setting and unsetting said bit positions, and retrieving said access request and grant semaphores stored in said access request and grant registers, using circuits that allow setting and clearing of individual access request and grant bits, and simultaneous reading of all access request and grant bits of said access request and grant semaphores stored in said access request and grant registers, said computer system further comprising said circuits; and said processors, said shared resource, said access request and grant registers, and said circuits are coupled to a high speed bus.

7. The method as set forth in claim 6, wherein,
said access request and grant registers are implemented with a first and a second plurality of latches; and said circuits comprise a first and a second plurality of tri-state buffers correspondingly coupled to said first and second plurality of latches for reading said access request and grant semaphores stored in said access request and grant registers, a first and a second plurality of AND gates correspondingly coupled to said first and second plurality of latches for individually setting said access request and grant bits of said access request and grant semaphores stored in said access request and grant registers, and a third and a fourth plurality of AND gates correspondingly coupled to said first and second plurality of latches for individually clearing said access request and grant bits of said access request and grant semaphores stored in said access request and grant registers.

8. The method as set forth in claim 6, wherein,
said access request and grant registers are implemented with a first and a second addressable latch; and said circuits comprise a first and a second a tri-state buffer correspondingly coupled to said first and second addressable latches for reading said access request and grant semaphores stored in said access request and grant registers, and a first and a second AND gate correspondingly coupled to said first and second addressable latches for individually setting/clearing said access request and grant bits of said access request and grant semaphores stored in said access request and grant registers.

9. The method as set forth in claim 1, wherein, said predetermined amount of time is greater than the largest amount of time required by the slowest of said processors to perform said step d) once and said step e).

10. The method as set forth in claim 1, wherein, said shared resource is an area in memory used for interprocessor communication between said processors.

11. In a computer system comprising a plurality of processors coupled to a shared resource, an apparatus for arbitrating accesses to said shared resource by said processors, said apparatus comprising:
  a) first storage means for storing an access request semaphore comprising a plurality of access request indicators correspondingly assigned to said processors, said access request indicators being priority ordered, said priority order being statically predetermine;
  b) second storage means for storing and access grant semaphore comprising a plurality of access grant indicators correspondingly assigned to said processors, said access grant indicators being similarly priority ordered as said access request indicators;
  c) access request means coupled to said first storage means and said processors for setting its assigned access request indicator of said access request semaphore by a requesting processor to request access to said shared resource, retrieving said access request semaphore repeatedly by said requesting processor to determine if said shared resource is currently requested by a higher priority processor, and resetting its assigned access request indicator of said access request semaphore by an ungranted processor to remove itself from requesting access to said shared resource, said requesting processor making said access request semaphore retrievals upon determining and shared resource is not granted to a lower priority processor, said ungranted processor making said access request indicator reset upon removing itself from being granted access to said shared resource; and
  d) access grant means coupled to said second storage means and said processors for retrieving said access grant semaphore repeatedly by said requesting processor to determine if said shared resource is currently granted to a lower priority processor, setting its assigned access grant indicator of said access grant semaphore by said requesting processor to grant itself access to said shared resource, and resetting its assigned access grant indicator of said access grant semaphore by a granted processor to remove itself from being granted access to said shared resource, said requesting processor making said access grant semaphore retrievals upon waiting a predetermined amount of time after setting its assigned access request indicator of said access request semaphore, said predetermined amount of time being sufficiently long for said access request indicator setting to be detected by each of said processors, said requesting processor making said access grant indicator setting upon determining said shared resource is not requested by a higher priority processor, said granted processor making said access grant indicator resetting upon completion of accessing said shared resource, said granted processor accessing said shared resource upon granting itself access to said share resource.

12. The apparatus as set forth in claim 11, wherein,
  said access request and access grant semaphores comprise a plurality of access request and grant bits respectively, said access request and grant bits being priority ordered in a statically predetermined ascending manner with the least and most significant bits indicating the lowest and highest priorities respectively;
  each of said processors is assigned one of said access request and grant bits of said access request and grant semaphores with the processors assigned the least and the most significant bits having the lowest and the highest priorities respectively;
  each of said requesting/accessing/ungranted processors sets and resets its assigned access request and grant bits respectively when requesting access, granting itself access, removing itself from being granted access, and removing itself from requesting access.

13. The apparatus as set forth in claim 12, wherein said requesting processor determines if said shared resource is currently granted to a lower priority processor by performing a logical AND operation against said access grant semaphore and an assigned access grant mask, said assigned access grant mask comprising a plurality of grant mask bits corresponding to said access grant bits of said access grant semaphore, said grant mask bits being set if they correspond to access grant bits that are lower than said assigned access grant bit of said requesting processor and not set if they correspond to all other grant bits.

14. The apparatus as set forth in claim 13, wherein, said requesting processor determines if said shared resource is currently being requested by a higher priority processor by performing a logical AND operation against said access request semaphore and an assigned access request mask, said assigned access request mask comprising a plurality of request mask bits corresponding to said access request bits of said access request semaphore, said request mask bits being set if they correspond to access request bits that are higher than said assigned access request bit of said requesting processor and not set if they correspond to all other request bits.

15. The apparatus as set forth in claim 12, wherein,
  said first and second storage means are the same memory means coupled to said processors comprising a first and second memory locations for storing said access request and grant semaphores, said computer system further comprising said memory; and
  said processors, said shared resource and said memory are coupled to a high speed bus, said high speed bus providing atomic bus cycles for accessing a selected one of said first and second memory locations.

16. The apparatus as set forth in claim 12, wherein,
  said first and second storage means are the same register means coupled to said processors comprising an access request register and an access grant register for storing said access request and grant semaphores respectively;

said access request and grant means comprise circuits coupled to said processors and said access request and grant registers for said requesting processor to set and reset said access request and grant bits, and to retrieve said access request and grant semaphores stored in said access request and grant registers, said circuits allowing setting and clearing of individual access request and grant bits, and simultaneous reading of all access request and grant bits of said access request and grant semaphores stored in said access request and grant registers; and said processors, said shared resource, said access request and grant registers, and said circuits are coupled to a high speed bus.

17. The apparatus as set forth in claim 16, wherein,
said access request and grant registers are implemented with a first and a second plurality of latches; and
said circuits comprise a first and a second plurality of tri-state buffers correspondingly coupled to said first and second plurality of latches for reading said access request and grant semaphores stored in said access request and grant registers, a first and a second plurality of AND gates correspondingly coupled to said first and second plurality of latches for individually setting said access request and grant bits of said access request and grant semaphores stored in said access request and grant registers, and a third and a fourth plurality of AND gates correspondingly coupled to said first and second, plurality of latches for individually clearing said access request and grant bits of said access request and grant semaphores stored in said access request and grant registers.

18. The apparatus as set forth in claim 16, wherein,
said access request and grant registers are implemented with a first and a second addressable latch; and
said circuits comprise a first and a second tri-state buffer correspondingly coupled to said first and second addressable latches for reading said access request and grant semaphores stored in said access request and grant registers, and a first and a second AND gate correspondingly coupled to said first and second addressable latches for individually setting/clearing said access request and grant bits of said access request and grant semaphores stored in said access request and grant registers.

19. The apparatus as set forth in claim 11, wherein, said predetermined amount of time is greater than the largest amount of time required by the slowest of said processors to perform one of said higher priority processor request determination and to set its assigned access grant indicator of said access grant semaphore.

20. The apparatus as set forth in claim 11, wherein, said shared resource is an area in memory coupled to said processors used for inter-processor communication between said processors, said computer system further comprising said memory.

* * * * *